(12) United States Patent
Lin

(10) Patent No.: US 11,652,914 B2
(45) Date of Patent: May 16, 2023

(54) PHONE APPLIANCE WITH DISPLAY SCREEN AND METHODS OF USING THE SAME

(71) Applicant: Ching-Yi Lin, New York, NY (US)

(72) Inventor: Ching-Yi Lin, New York, NY (US)

( * ) Notice: Subject to any disclaimer, the term of this patent is extended or adjusted under 35 U.S.C. 154(b) by 0 days.

(21) Appl. No.: 14/176,598

(22) Filed: Feb. 10, 2014

(65) Prior Publication Data
US 2014/0192800 A1 Jul. 10, 2014

Related U.S. Application Data

(63) Continuation of application No. 12/106,617, filed on Apr. 21, 2008, now Pat. No. 8,687,781, which is a
(Continued)

(51) Int. Cl.
*H04M 11/00* (2006.01)
*H04M 1/00* (2006.01)
(Continued)

(52) U.S. Cl.
CPC .............. *H04M 1/00* (2013.01); *G06Q 30/02* (2013.01); *H04L 67/34* (2013.01); *H04L 67/535* (2022.05);
(Continued)

(58) Field of Classification Search
CPC .. G04M 1/2471; G04M 1/2473; G04M 1/247; G04M 1/2535; G04M 15/56;
(Continued)

(56) References Cited

U.S. PATENT DOCUMENTS

| 5,127,050 A | 6/1992 | Takahashi et al. |
|---|---|---|
| 5,497,339 A | 3/1996 | Bernard |

(Continued)

FOREIGN PATENT DOCUMENTS

| AU | 5075398 A | 6/1998 |
|---|---|---|
| AU | 1359099 A | 6/1999 |

(Continued)

OTHER PUBLICATIONS

PCT International Search Report dated Oct. 18, 2001 for PCT/US01/20896.

(Continued)

*Primary Examiner* — Melur Ramakrishnaiah
(74) *Attorney, Agent, or Firm* — Georgi Korobanov

(57) ABSTRACT

A phone appliance and method of use are provided where the phone appliance can be used to make VoIP communications calls. In a preferred embodiment, the phone appliance includes an RF connection for connecting to a computer or other computing device for facilitating the placement of the VoIP communications calls. The phone appliance further includes a display or portal for depicting advertisements provided by various advertisers. The advertisements provided can be used to defray all or part of the cost associated with making VoIP communications calls. The portal can also be used to communicate with businesses for ordering products, such as ordering a pizza, and to perform various services, such as purchasing stocks. In an exemplary system, the phone appliance is used to transmit to a control center information related to the user of the phone appliance, such as interests and buying habits, and queries for receiving additional information for various advertised products and services. The control center transmits the queries to the appropriate vendors for providing the user with additional information. Other functions and features are provided to the (Continued)

phone appliance, such as being able to download e-mail messages stored within or received by the computer.

119 Claims, 4 Drawing Sheets

Related U.S. Application Data continuation of application No. 10/909,680, filed on Aug. 2, 2004, now Pat. No. 7,376,222, which is a continuation of application No. 09/896,593, filed on Jun. 29, 2001, now abandoned.

(60) Provisional application No. 60/214,913, filed on Jun. 29, 2000.

(51) Int. Cl.
*G06Q 30/02* (2023.01)
*H04M 1/247* (2021.01)
*H04M 1/253* (2006.01)
*H04M 15/00* (2006.01)
*H04L 67/00* (2022.01)
*H04L 69/329* (2022.01)
*H04L 67/50* (2022.01)
*H04L 51/00* (2022.01)

(52) U.S. Cl.
CPC ........ *H04L 69/329* (2013.01); *H04M 1/2471* (2013.01); *H04M 1/2473* (2013.01); *H04M 1/2478* (2013.01); *H04M 1/2535* (2013.01); *H04M 15/56* (2013.01); *H04M 15/83* (2013.01); *H04M 15/84* (2013.01); *H04L 51/00* (2013.01); *H04M 2201/38* (2013.01); *H04M 2207/203* (2013.01); *H04M 2215/202* (2013.01); *H04M 2215/81* (2013.01); *H04M 2215/8129* (2013.01); *H04M 2250/22* (2013.01)

(58) Field of Classification Search
CPC ........ G04M 15/83; G04M 15/84; G04M 1/00; G04M 2201/38; G04M 2207/203; G04M 2215/202; G04M 2215/81; G04M 2215/6128; G04M 2250/22; H04L 67/34; H04L 67/22; H04L 69/329; H04L 12/58
USPC ......... 379/93.01, 93.02, 93.05, 93.08, 93.15, 379/93.17, 93.23, 93.24, 93.25, 110.01, 379/114.01; 370/352–356, 366, 493–495; 455/419, 418, 412
See application file for complete search history.

(56) References Cited

U.S. PATENT DOCUMENTS

| | | |
|---|---|---|
| 5,515,098 A | 5/1996 | Carles |
| 5,515,305 A | 5/1996 | Register et al. |
| 5,546,395 A | 8/1996 | Sharma et al. |
| 5,606,361 A | 2/1997 | Davidsohn et al. |
| 5,724,092 A | 3/1998 | Davidsohn et al. |
| 5,761,280 A | 6/1998 | Noonen et al. |
| 5,784,436 A | 7/1998 | Rosen et al. |
| 5,796,394 A | 8/1998 | Wicks et al. |
| 5,838,775 A * | 11/1998 | Montalbano .......... H04M 1/247 |
| | | 379/93.23 |
| 5,841,424 A | 11/1998 | Kikinis |
| 5,847,698 A | 12/1998 | Reavey et al. |
| 5,848,137 A | 12/1998 | Hsiao |
| 5,867,793 A | 2/1999 | Davis |
| 5,873,068 A * | 2/1999 | Beaumont .......... G06Q 30/0255 |
| | | 340/5.91 |
| 5,884,032 A | 3/1999 | Bateman et al. |
| 5,887,054 A | 3/1999 | Burke et al. |
| 5,892,764 A | 4/1999 | Riemann et al. |
| D411,534 S | 6/1999 | Lepack et al. |
| 5,923,736 A | 7/1999 | Shachar |
| 5,923,738 A | 7/1999 | Cardillo, IV et al. |
| 5,930,341 A | 7/1999 | Cardillo, IV et al. |
| 5,930,719 A | 7/1999 | Babitch et al. |
| 5,937,041 A | 8/1999 | Cardillo, IV et al. |
| 5,941,648 A | 8/1999 | Robinson et al. |
| 5,953,322 A | 9/1999 | Kimball |
| 5,956,048 A | 9/1999 | Gaston |
| 5,966,667 A | 10/1999 | Halloran et al. |
| 5,974,043 A | 10/1999 | Solomon |
| 5,978,833 A | 11/1999 | Pashley et al. |
| 5,983,073 A | 11/1999 | Ditzik |
| 5,986,690 A | 11/1999 | Hendricks |
| 5,991,634 A | 11/1999 | Hui et al. |
| 5,996,006 A | 11/1999 | Speicher |
| 6,002,394 A | 12/1999 | Schein et al. |
| 6,006,088 A | 12/1999 | Couse |
| 6,011,794 A | 1/2000 | Mordowitz et al. |
| 6,018,571 A | 1/2000 | Langlois et al. |
| 6,021,325 A | 2/2000 | Hall |
| 6,028,917 A | 2/2000 | Creamer et al. |
| 6,031,836 A | 2/2000 | Haserodt |
| 6,035,180 A | 3/2000 | Kubes et al. |
| 6,035,214 A | 3/2000 | Henderson |
| 6,038,296 A | 3/2000 | Brunson et al. |
| 6,040,829 A | 3/2000 | Croy et al. |
| 6,052,439 A | 4/2000 | Gerszberg et al. |
| 6,058,106 A | 5/2000 | Cudak et al. |
| 6,058,422 A | 5/2000 | Ayanoglu et al. |
| 6,064,874 A | 5/2000 | Cox et al. |
| 6,064,967 A | 5/2000 | Speicher |
| 6,065,120 A | 5/2000 | Laursen et al. |
| 6,069,890 A | 5/2000 | White et al. |
| 6,075,783 A | 6/2000 | Voit |
| 6,075,796 A | 6/2000 | Katseff et al. |
| 6,078,566 A | 6/2000 | Kikinis |
| 6,084,953 A | 7/2000 | Bardenheuer et al. |
| 6,108,329 A | 8/2000 | Oyama et al. |
| 6,122,263 A | 9/2000 | Dahlin et al. |
| 6,145,002 A * | 11/2000 | Srinivasan ............ H04L 67/16 |
| | | 370/546 |
| 6,161,134 A | 12/2000 | Wang et al. |
| 6,163,704 A | 12/2000 | Joong et al. |
| 6,169,734 B1 | 1/2001 | Wilson |
| 6,175,922 B1 * | 1/2001 | Wang .................... G06Q 20/02 |
| | | 380/255 |
| 6,188,887 B1 | 2/2001 | Joong et al. |
| 6,198,941 B1 | 3/2001 | Aho et al. |
| 6,215,480 B1 * | 4/2001 | Danis ................... G06F 1/1626 |
| | | 178/18.01 |
| 6,222,520 B1 | 4/2001 | Gerszberg et al. |
| 6,223,291 B1 * | 4/2001 | Puhl ....................... G06F 21/10 |
| | | 726/28 |
| 6,233,320 B1 | 5/2001 | Haimi-Cohen |
| 6,246,489 B1 | 6/2001 | Park |
| 6,256,498 B1 | 7/2001 | Ludwig |
| 6,295,457 B1 * | 9/2001 | Narayanaswamy .. H04W 88/12 |
| | | 370/230 |
| 6,332,084 B1 * | 12/2001 | Shaanan et al. ............ 455/566 |
| 6,335,678 B1 | 1/2002 | Heutschi |
| 6,335,753 B1 | 1/2002 | McDonald |
| 6,370,141 B1 | 4/2002 | Giordano, III et al. |
| 6,377,573 B1 | 4/2002 | Shaffer et al. |
| 6,393,014 B1 | 5/2002 | Daly et al. |
| 6,396,531 B1 * | 5/2002 | Gerszberg ........... H04M 1/2535 |
| | | 348/14.01 |
| 6,404,811 B1 | 6/2002 | Cvetko et al. |
| 6,405,033 B1 * | 6/2002 | Kennedy, III .......... H04M 3/51 |
| | | 455/414.1 |
| 6,411,393 B1 | 6/2002 | Wakasugi |
| 6,424,647 B1 * | 7/2002 | Ng ......................... H04L 29/06 |
| | | 370/352 |
| 6,430,270 B1 | 8/2002 | Cannon et al. |
| 6,434,403 B1 * | 8/2002 | Ausems ................ G06F 1/1626 |
| | | 455/556.2 |

(56) References Cited

U.S. PATENT DOCUMENTS

| | | |
|---|---|---|
| 6,438,384 B1 | 8/2002 | Chen |
| 6,446,127 B1 | 9/2002 | Schuster et al. |
| 6,449,269 B1 * | 9/2002 | Edholm .................. 370/352 |
| 6,477,708 B1 | 11/2002 | Sawa |
| 6,493,437 B1 | 12/2002 | Olshansky |
| 6,510,208 B1 | 1/2003 | Komiya |
| 6,516,203 B1 | 2/2003 | Enzmann et al. |
| 6,519,241 B1 | 2/2003 | Theimer |
| 6,529,602 B1 | 3/2003 | Walker et al. |
| 6,552,825 B1 | 4/2003 | Doi et al. |
| 6,557,756 B1 | 5/2003 | Smith |
| 6,560,468 B1 | 5/2003 | Boesen |
| 6,567,854 B1 * | 5/2003 | Olshansky ............ G06Q 30/02 705/14.46 |
| 6,587,684 B1 * | 7/2003 | Hsu ................... H04M 1/72525 370/328 |
| 6,622,017 B1 * | 9/2003 | Hoffman ................ G06F 8/65 455/412.1 |
| 6,636,506 B1 | 10/2003 | Fan |
| 6,643,283 B2 | 11/2003 | Derks |
| 6,662,025 B1 * | 12/2003 | Bond ............... H04M 1/72552 455/150.1 |
| 6,678,891 B1 * | 1/2004 | Wilcox ............. G06Q 30/0601 348/E5.105 |
| 6,680,919 B1 | 1/2004 | Rauhala |
| 6,708,221 B1 * | 3/2004 | Mendez ................ G06F 9/54 709/204 |
| 6,728,546 B1 | 4/2004 | Peterson et al. |
| 6,744,759 B1 | 6/2004 | Sidhu et al. |
| 6,754,509 B1 * | 6/2004 | Khan .................. H04B 1/3805 455/550.1 |
| 6,757,363 B1 * | 6/2004 | Platt ................... H04M 1/253 379/88.11 |
| 6,760,324 B1 | 7/2004 | Scott et al. |
| 6,766,524 B1 | 7/2004 | Matheny et al. |
| 6,795,429 B1 | 9/2004 | Schuster et al. |
| 6,807,564 B1 | 10/2004 | Zellner et al. |
| 6,826,174 B1 * | 11/2004 | Erekson ............ H04M 1/2535 370/352 |
| 6,847,403 B1 | 1/2005 | Forsberg, Jr. et al. |
| 6,847,632 B1 * | 1/2005 | Lee ................. H04L 29/06027 370/352 |
| 6,854,009 B1 | 2/2005 | Hughes |
| 6,857,072 B1 | 2/2005 | Schuster et al. |
| 6,876,858 B1 | 4/2005 | Duvall et al. |
| 6,882,853 B2 | 4/2005 | Meyers |
| 6,888,929 B1 | 5/2005 | Saylor et al. |
| 6,889,321 B1 | 5/2005 | Kung et al. |
| 6,893,347 B1 * | 5/2005 | Zilliacus ............. A63F 13/12 463/41 |
| 6,937,699 B1 * | 8/2005 | Schuster ............ G06Q 30/02 379/67.1 |
| 6,944,151 B1 | 9/2005 | Menard |
| 6,954,633 B1 | 10/2005 | Metternich et al. |
| 6,961,574 B1 * | 11/2005 | Stage ................ H04M 1/7253 370/351 |
| 6,968,380 B1 | 11/2005 | Singhal ............. H04L 67/02 709/222 |
| 6,970,474 B1 * | 11/2005 | Sinha ............. H04L 29/06027 370/352 |
| 7,003,327 B1 * | 2/2006 | Payne ............. H04M 1/2745 340/3.55 |
| 7,025,209 B2 * | 4/2006 | Hawkins ............ H04W 4/18 709/217 |
| 7,039,699 B1 * | 5/2006 | Narin ............... G06Q 30/02 709/207 |
| 7,039,709 B1 * | 5/2006 | Beadle ............. H04L 45/12 709/203 |
| 7,076,434 B1 | 7/2006 | Newnam et al. |
| 7,167,728 B1 * | 1/2007 | Wagner ........... H04M 1/72522 379/88.14 |
| 7,225,142 B1 * | 5/2007 | Apte ................ G06Q 30/02 380/30 |
| 7,225,409 B1 | 5/2007 | Schnarel et al. |
| 7,319,743 B1 * | 1/2008 | Dunlap ............... H04M 1/247 379/142.17 |
| 7,348,961 B1 * | 3/2008 | Shneidman ......... G06F 1/1626 345/156 |
| 7,376,222 B2 | 5/2008 | Lin |
| 7,451,195 B1 | 11/2008 | Seligmann |
| 7,489,768 B1 * | 2/2009 | Strietzel ............ H04M 3/4878 379/114.05 |
| 7,496,947 B1 * | 2/2009 | Meyers ............. H04N 7/17318 725/44 |
| RE41,211 E | 4/2010 | Tegler et al. |
| 7,729,943 B1 * | 6/2010 | Leglise ........... G06Q 30/0277 705/14.73 |
| 7,945,284 B1 | 5/2011 | Cao et al. |
| 8,687,781 B2 | 4/2014 | Lin |
| 11,563,834 B2 | 1/2023 | Lin |
| 2001/0012769 A1 | 8/2001 | Sirola et al. |
| 2001/0014599 A1 | 8/2001 | Henderson |
| 2001/0020242 A1 * | 9/2001 | Gupta ................ G06Q 30/02 715/210 |
| 2001/0040621 A1 | 11/2001 | Gerszberg et al. |
| 2001/0040948 A1 | 11/2001 | McClure et al. |
| 2002/0019224 A1 | 2/2002 | Meyers |
| 2002/0046084 A1 * | 4/2002 | Steele ............... G06Q 30/02 705/14.64 |
| 2002/0049073 A1 | 4/2002 | Bell |
| 2002/0054579 A1 * | 5/2002 | Miloslavsky ......... H04L 29/06 370/352 |
| 2002/0065728 A1 * | 5/2002 | Ogasawara ........ G06Q 20/208 705/23 |
| 2002/0126679 A1 | 9/2002 | Morton |
| 2002/0164003 A1 | 11/2002 | Chang et al. |
| 2003/0081590 A1 | 5/2003 | Maroulis |
| 2003/0169282 A1 * | 9/2003 | Herigstad ............ G06F 3/0236 715/700 |
| 2011/0153779 A1 * | 6/2011 | Mendez ............. G06F 21/6218 709/218 |

FOREIGN PATENT DOCUMENTS

| | | | |
|---|---|---|---|
| AU | 776908 B2 | 9/2004 | |
| CA | 2271425 A1 | 5/1998 | |
| CA | 2311726 A1 | 6/1999 | |
| CA | 2359675 A1 | 7/2000 | |
| DE | 19943151 A1 | 11/2000 | |
| DE | 10144701 A1 | 3/2002 | |
| DE | 20023128 U1 | 4/2003 | |
| EP | 0918423 A2 | 5/1999 | |
| EP | 1189871 A1 | 7/2000 | |
| GB | 2366946 A | 3/2002 | |
| IN | 214854 A1 | 3/2008 | |
| JP | 408263409 | 10/1966 | |
| JP | 10228431 A | 8/1998 | |
| JP | 2002535940 A | 10/2002 | |
| JP | 4592957 B2 | 12/2010 | |
| KR | 19960034533 A | 8/1998 | |
| KR | 2000024189 A * | 5/2000 | ............ H04N 7/14 |
| MX | PA01007432 A | 10/2003 | |
| TW | 437245 B | 5/2001 | |
| WO | 9632800 A1 | 10/1996 | |
| WO | WO-9750222 A1 * | 12/1997 | ............ G06F 8/65 |
| WO | 9823110 A2 | 5/1998 | |
| WO | O9927724 A1 | 6/1999 | |
| WO | WO-9950775 A1 * | 10/1999 | ............ G06Q 30/02 |
| WO | 0044185 A1 | 7/2000 | |
| WO | WO 01/20506 A1 | 3/2001 | |

OTHER PUBLICATIONS

"France Telecom to launch WAP services based on Nokia's WAP solution", NOKIA, Jan. 2000, 1 page; <https://www.nokia.com/en_int/news/releases/2000/01/24/france-telecom-to-launch-wap-services-based-on-nokias-wap-solution>.

English translation of JP4592957 from Lexis Nexis Total Patent One.

(56) References Cited

OTHER PUBLICATIONS

English translation of TW437245 from Lexis Nexis Total Patent One.
English translation of DE19943151 from Lexis Nexis Total Patent One.
English translation of DE20023128 from Lexis Nexis Total Patent One.
English translation of JP2002535940 from Lexis Nexis Total Patent One.
English translation of DE10144701 from Lexis Nexis Total Patent One.
English translation of MXPA01007432 from Lexis Nexis Total Patent One.
English translation of JP10228431 from Lexis Nexis Total Patent One.
English translation of KR19980034533A from Lexis NexisTotal Patent One.
Leavitt, Neal, "Will WAP Deliver The Wireless Internet?" Technology News. (May 2000) pp. 16-20.
Nokia, Annual Report 1996, 1996, pp. 4, 15, 17, 18, 30.
Nokia, Application Guide, 1999, Nokia Mobile Phones 1999-2000.
Oancea, Constantin Daniel, "GSM Infrastructure Used for Data Transmission" 2011 The 7th International Symposium an Advanced Topics in Electrical Engineering, May 12-14, 2011.
"First WAP Offerings Roll out in France," RCRWireless, Intelligence on All Things Wireless, May 10, 1999, https://www.rcrwireless.com/19990510/archived-articles/first-wap-offerings-roll-out-in-france.
International Telecommunications Terminals, Group 3, "Series T:Terminals for Telematic Services, Procedures for the transfer of facsimile data via store-and-forward on the Internet,Recommendation ITU-T T.37" Jun. 1998 (Approval Jun. 18, 1998), Printed in Switzerland, Geneva, 1998.
International Telecommunications Terminals, Group 3, "Series T:Terminals for Telematic Services, Procedures for real-time Group 3 facsimile communication over IP networks, Recommendation ITU-T T.38", Jun. 1998 (Approval Jun. 18, 1998), Printed in Switzerland, Geneva, 1998.

* cited by examiner

PHONE APPLIANCE WITH DISPLAY SCREEN AND METHODS OF USING THE SAME

PRIORITY

The present application is a continuation application which claims priority to a United States Utility Patent Application filed on Apr. 21, 2008 and having U.S. patent application Ser. No. 12/106,617 which is a continuation application of a United States Utility Patent Application filed on Aug. 2, 2004 and having U.S. patent application Ser. No. 10/909,680, now U.S. Pat. No. 7,376,222 issued on May 20, 2008, which is a continuation application of a United States Utility Patent Application filed on Jun. 29, 2001 and having U.S. patent application Ser. No. 09/896,593, abandoned, and which claims priority to a United States Provisional Application filed on Jun. 29, 2000 and having U.S. Provisional Application Ser. No. 60/214,913, the contents of all applications are incorporated herein by reference.

BACKGROUND OF THE INVENTION

1. Technical Field

The present disclosure relates generally to a communications device and, more particularly, to a phone appliance, which transmit voice over data network, which will henceforth in this patent, vernacularly, be referred to as an IP Phone or phone appliance including a display screen for displaying advertisements and other information downloaded from a network. The present disclosure also relates to a method of using a phone appliance having a display screen and, more particularly, to a method of using a phone appliance having a display screen for providing unique benefits to a user, e.g., defraying part or all of the cost of phone service.

2. Background of Related Art

Sending voice over data network, such as Voice-over-Internet protocol (VoIP) communications, is quickly emerging as a viable means for communicating. For example, communications over data networks can entail a calling party using a standard telephone to place a call by connecting to the public switched telephone network (PSTN). The call is routed by the PSTN via the Internet by an originating gateway. After being routed through the Internet, the call exits the Internet and is received by a destination gateway. At the destination gateway, the call is routed through the PSTN to a standard telephone of a called party.

The main advantage of communications over data network is the ability to make long distance telephone calls at a fraction of the cost of traditional circuit-based calls. For example, the calling party may reside in Brooklyn, N.Y. and the called party may reside in London, England. Nonetheless, the calling party is billed for the VoIP telephone call to London, England at a lower rate than tradition circuit-based calls, since much of the voice is transmitted through data network such as the Internet. It is, however, predicted that this main advantage of VoIP communications will soon be reduced. Regulations and laws are being proposed to charge VoIP providers access charges, which comprise a percentage of the cost of providing traditional long distance. Therefore, it is foreseen that once these regulations and laws are passed, consumers will use VoIP communications less frequently than once imagined.

Further, communications over data networks, such as VoIP, may be used for foregoing long distance telephone charges. For example, VoIP communications have not evolved significantly to provide for performing other services while making a VoIP telephone call, such as integrating voice with data, allowing consumers to view advertisements, video clips, etc. and for replying to the same, and making VoIP more seamless for consumers to use.

Additionally, in order to make communications over data network a more lucrative tool for VoIP or a related communications companies, business methods need to be implemented where the communications companies receive a fee for various actions performed by the calling and called parties while on a data communications call.

Therefore, a need exists for preventing a decrease in VoIP or its liked data communications due to charging consumers who make such communication calls at long distance telephone calling rates.

A need also exists for making the use of a PC or other computing device together with a phone seamless when both devices are used to make VoIP communications calls.

A need also exists for enabling consumers to perform other services while making the VoIP communication call and for charging a VoIP communications company or other service provider company, or the consumers, with a fee for the services performed by the consumers. Such fees are likely to be used to defray the cost associated with making VoIP communications calls or other data communications calls at long distance telephone calling rates.

Further, a need exists for a phone appliance having a portal for displaying data transmitted over the VoIP data network.

SUMMARY

In accordance with the present invention, a phone appliance and method of use are provided where the phone appliance can be used to make data communications calls such as VoIP. In a preferred embodiment, the phone appliance includes an RF connection for connecting to a computer or other computing device for facilitating the placement of the VoIP or another data communications type calls. The phone appliance further includes a display or portal for depicting advertisements or information provided by various advertisers or vendors. The advertisements provided can be used to defray all or part of the cost associated with making VoIP or a relate data communications calls. The portal can also be used to communicate with businesses for ordering products, such as ordering a pizza, and to perform various services, such as purchasing stocks. In an exemplary system, the phone appliance is used to transmit to a control center information related to the user of the phone appliance, such as interests and buying habits, and queries for receiving additional information for various advertised products and services. The control center transmits the queries to the appropriate vendors for providing the user with additional information. Other functions and features are provided to the phone appliance, such as being able to download e-mail messages stored within or received by the computer.

BRIEF DESCRIPTION OF THE DRAWINGS

Various preferred embodiments of the presently disclosed phone appliance are described herein with reference to the drawings, wherein.

DETAILED DESCRIPTION OF PREFERRED EMBODIMENTS

Figure 1:
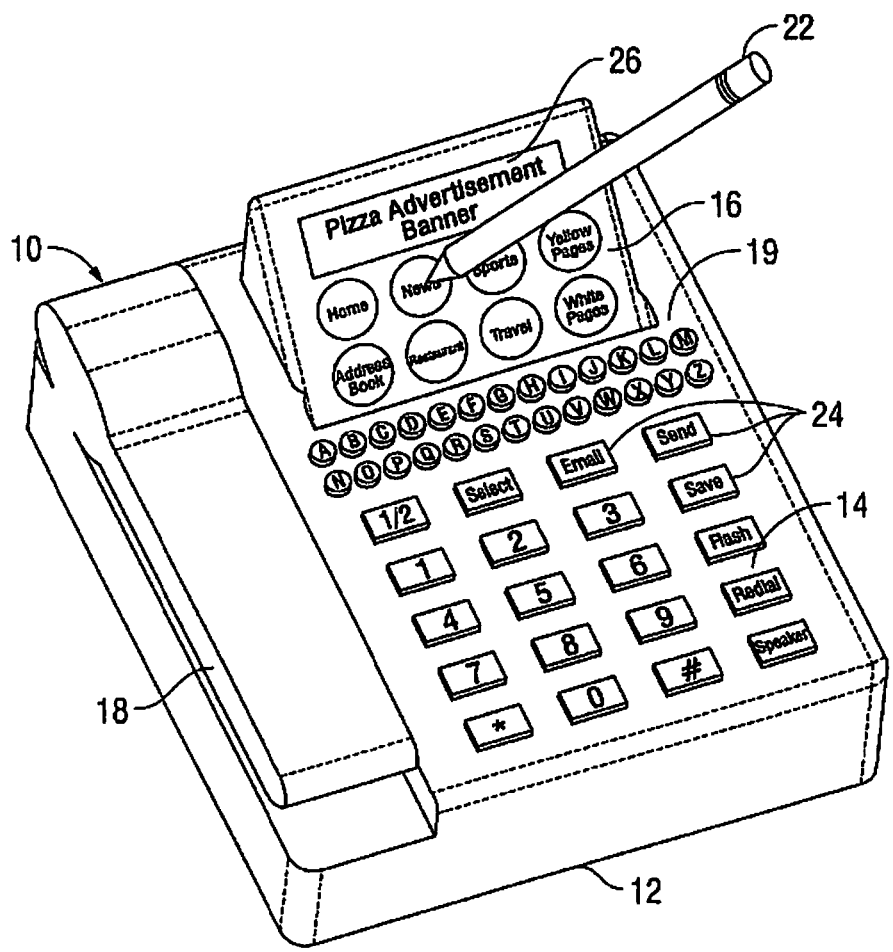
FIG. 1 is a perspective view of the presently disclosed phone appliance.

Preferred embodiments of the presently disclosed phone appliance and methods of use will now be described herein with reference to the attached drawings, in which like reference numerals designate identical or corresponding elements in each of the several views.

Figure 2:
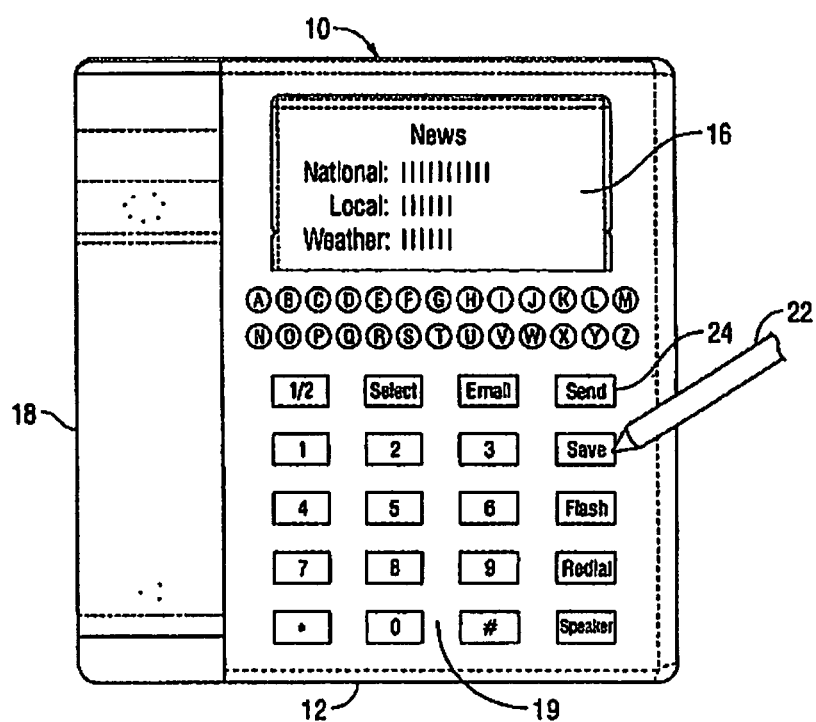
FIG. 2 is a top view of the phone appliance shown in FIG. 1.
Figure 3:
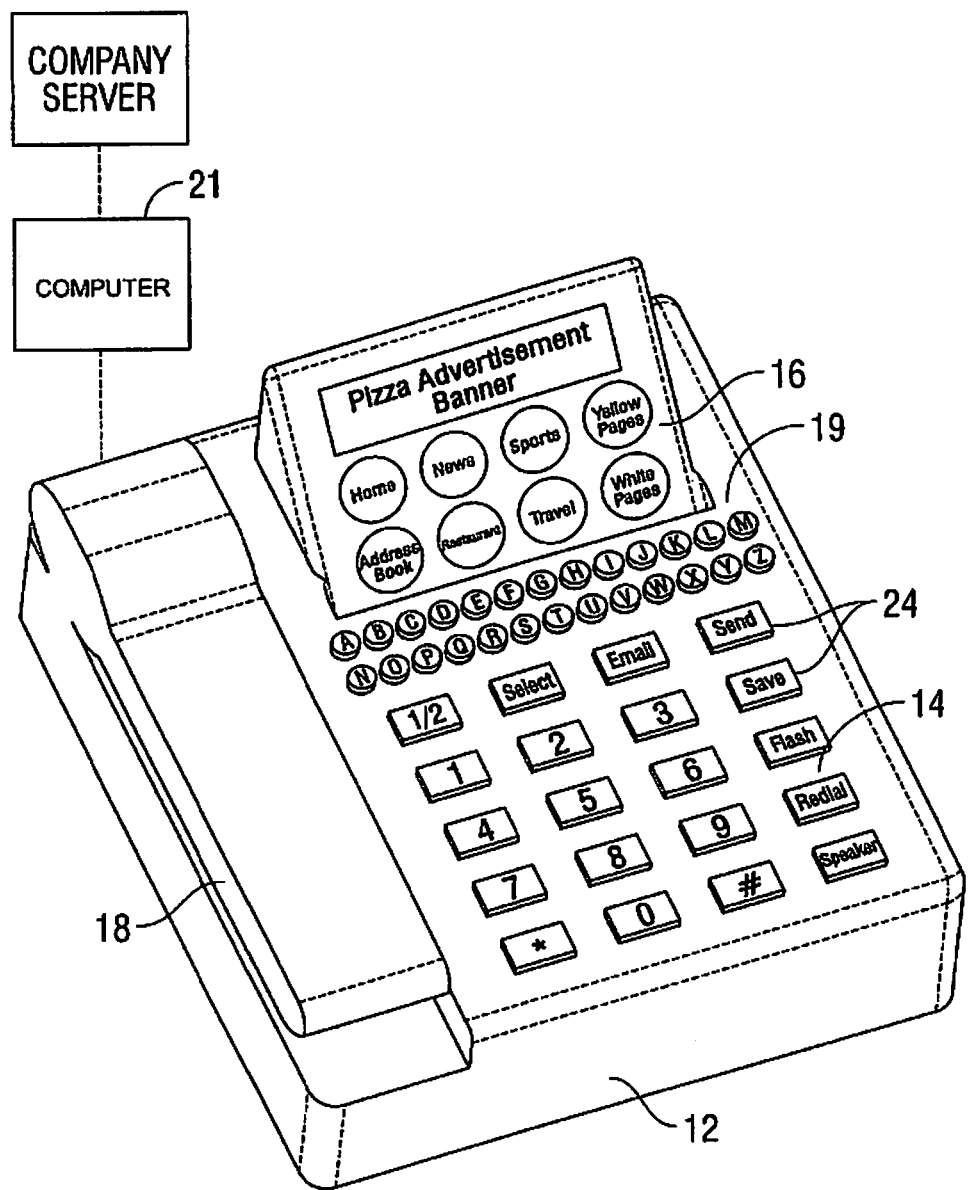
FIG. 3 is a perspective view of the phone appliance shown in FIG. 1 shown schematically interfaced with a personal computer and a company server.

Referring to FIGS. 1-3 below, phone appliance 10 includes a housing 12 having a keyboard 14 and a display screen 16. Display screen 16 is preferably formed from liquid crystal display (LCD). Alternately, other types of display screens may be used, e.g., organic light emitting diodes (OLED). A phone handset 18 is supported on housing 12 in a conventional manner. Handset 18 may be directly connected to the housing 12 via an electrical cord, or alternatively, may be of the cordless type. Although not shown, phone appliance 10 may also include a speaker phone function.

The phone appliance 10 can be adapted to be connected to any computer port to interface phone appliance 10 to a computer 21, but is preferably connected through a universal serial bus (USB) port (not shown). Alternatively, phone appliance 10 can include a wireless transceiver, such as a wireless RF transceiver, to wirelessly interface phone appliance 10 to a computer 21 with a matching transceiver.

Voice data, multimedia data, and other data can be transmitted to and from the computer 21 and phone appliance 10 via the USB port or via RF signals. By using a USB port or RF signals to communicate between the phone appliance 10 and the computer 21, VoIP communications or other type of communications can be integrated with the Internet or a data network in a more cost-effective manner than if the computer 21 alone or the phone appliance 10 alone was used for making VoIP communications over a VoIP data network or another voice over data network.

By using a USB port or RF signals to communicate between the phone appliance 10 and the computer 21, the phone appliance 10 can be provided with less computing, processing and/or memory resources, since the computing, processing and/or memory resources of the computer 21 are used, i.e., shared, by the phone appliance 10 through the USB or RF connection for providing VoIP communications or other data-type communications. By using less computing, processing and/or memory resources, the fabrication and retail costs of the phone appliance 10 may be reduced.

For example, the phone appliance 10 may utilize a network browser program, such as Netscape Navigator™, installed within the computer 21 and the computer's modem for accessing the Internet, thereby, being a cheaper priced phone appliance than a phone appliance that does not communicate via a USB port or RF signals with a computer and must have its own browser program and modem for connecting to the voice over data network. It is a cost-effective to have the phone appliance mimic the computer with services such as e-mail, Internet access and portal features. In such an embodiment, one can use the phone appliance 10 to make VoIP or another data-type communications, or access the Internet, by dialing the called party via the Internet (or other data network) without being "aware" that the call is being placed through the Internet. To the user, the phone appliance 10 is a traditional phone that can be carried anywhere for placing VoIP or other data-type communication calls given the appropriate connections.

It is further provided that the phone appliance 10 includes means for receiving data from the computer 21, such as e-mail, to enable one to access data stored within the computer 21 via the phone appliance 10. Further, the phone appliance 10 can be upgraded with new software by downloading the new software from the data network by the IP phone 10 and/or wirelessly transmit the new software to the IP phone 10 via the RF connection between the computer 21 and the IP phone 10.

Any RF transceiver commercially available from a number of sources, such as Intel (AnyPoint™ Wireless Home Network), can be provided to the phone appliance 10. The computer 21 in turn can access a phone network, such as the PSTN.

The PSTN in turn accesses a data network, such as the Internet. Such access may be obtained a number of ways, for example, via a local area network, a dial up connection, any local loop access technology that calls for modems such as a digital subscriber line (DSL) or a cable modem connection. The data network is used via the computer 21 to transport voice data point-to-point, or partially in conjunction with the PSTN and pathways, to complete the call and carry on a VoIP communication. The data network also transports data to and from the IP phone keyboard 14 and display 16 via the computer 21 for purposes described herein below.

Keyboard 14 includes an alpha-numeric keypad 19 which can be used to place a phone call or access and/or retrieve information from a computer 21 and display the information on display screen 16. For example, display screen 16 is optionally a touch screen which allows the user to access display information such as the yellow pages, addresses, news, stock quotes, etc. by touching a pointer 22 to the corresponding area on display screen 16. A touch pad or mouse ball may also be incorporated in lieu of a touch screen in a known manner to control a pointer on the display screen 16 to select the desired display information.

The phone appliance 10 may also include additional features to improve upon the quality and speed of phone service and/or the security of the transmission system. For example, phone appliance 10 may include a digital signal processor to improve the sound quality of the voice transmission or hardware vocoders and communication circuitry to transmit alpha-numeric as well as voice data. The phone appliance 10 may also include means for converting analog to digital, generating sets or packets of digital data from voice signals and alpha-numeric inputs and means for compressing the digital data to increase the speed and efficiency of the data transmission, including providing better sound quality than a PC sound card. An encryption encoder and a decryption decoder or equivalent software may also be provided in phone appliance 10 to facilitate secure transmission of voice and alpha-numeric information. The phone appliance 10 may further include a video camera or a port for connecting a video camera to the phone appliance 10. The video camera can be used for transmitting a video image of a user of the phone appliance 10, e.g., as in a video-phone. The phone appliance 10 may further include GSM capability.

The phone appliance 10 also includes software and hardware for performing gateway functions that provide two-way, real time communication interfaces between an IP-based or data network and a telephony network including mapping, translation, signaling and control of the media and signaling gateway. By being able to perform gateway functions, the phone appliance 10 prevents the bottleneck effect, since the phone appliance 10 includes in essence the originating gateway. Further, the gateway functions also helps reduce the cost of providing voice-over-data communications networks, since some call origination cost(s) may be eliminated.

In a preferred embodiment, display screen 16 is used to display advertisements or information downloaded from the data network via the computer 21 (FIG. 3). The advertisements or information can be used, for example, to defray the consumer cost associated with phone service. More specifically, advertisements and other information can be downloaded from the data network via the computer 21 onto display screen 16 of IP phone 10 while a VoIP or related data type communication call is in progress. It is also contemplated to download advertisements and other information using the IP phone 10 when there is no VoIP or voice communication call in progress.

In exchange for displaying the advertisements, the advertiser or user can defray part or all of the cost of the phone and/or service. The advertiser or user can pay a flat or variable fee to the long distance provider and/or any other service provider to defray the cost of the phone and/or service. Alternately, each advertisement or information may include an identifier, which is recognized by software or hardware in phone appliance 10 or computer 21. Thereafter, the advertiser or vendor will be charged a specified fee for the advertising or information by a service provider.

Figure 4:
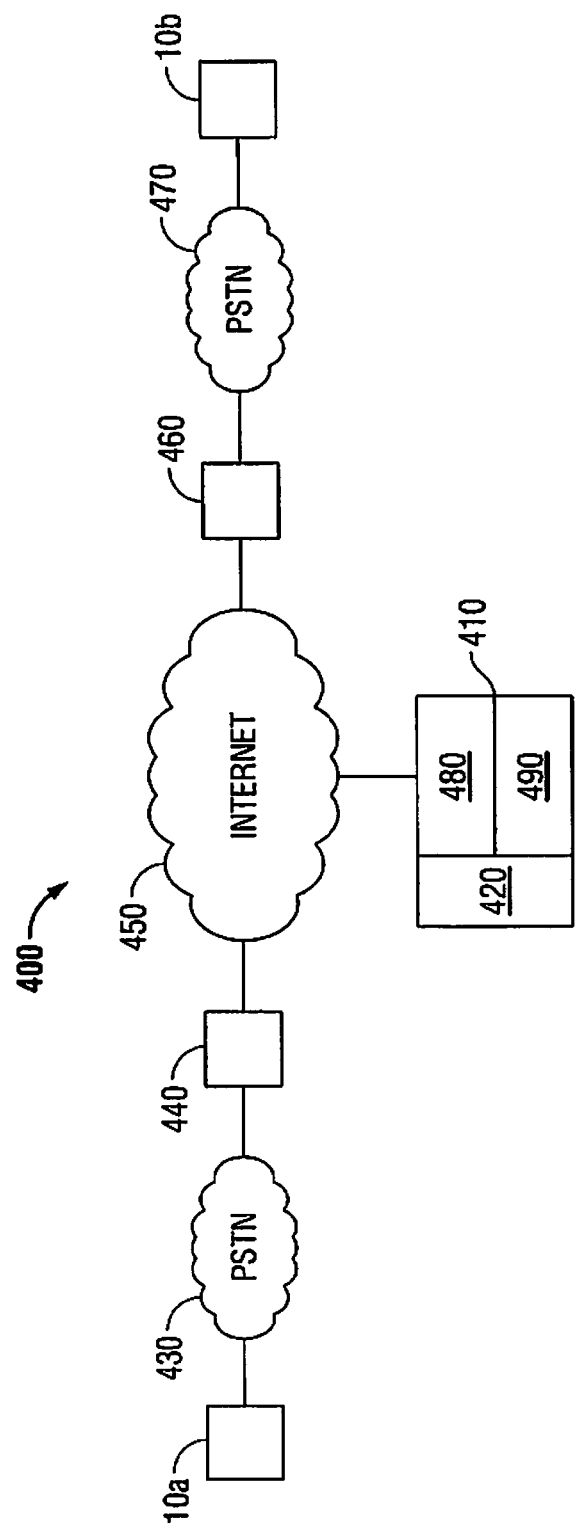
FIG. 4 is a block diagram of a system according to the present invention.

For example, with reference to FIG. 4, a service provider of a system 400 maintains a control center 410 having a database 420 storing a plurality of advertisements or information therein. Upon the establishment of a VoIP or another data type communication call between a calling party using a first phone appliance 10*a* and a called party using a second phone appliance 10*b* data packets are transmitted along with the voice packets from one or both of the IP phones 10*a*, 10*b*. For example, the voice packets are transmitted to the opposite party via a first PSTN 430, an originating gateway 440, the Internet 450, a destination or terminating gateway 460, and a second PSTN 470, as known in the art.

On the other hand, the data packets are transmitted to the control center 410 via the first PSTN 430, the originating gateway 440, and the Internet 450, and/or the destination gateway 460, the second PSTN 470, and the Internet 450. The data packets contain a head-end for being correctly routed to the control center 410 and identifying information. The identifying information is used by the control center 410 to determine from which phone appliance 10 the data packets originated from. Once the originating phone appliance 10 is determined by the service provider, the service provider can target specific advertisements, video clips, messages, etc. stored within the database 420 to the user of the originating phone appliance 10 during the duration of the VoIP or data typed communication call. The specific advertisements, video clips, messages, etc. could be related to interests, products of interest, and other promotional information (which may be, for example, of interest to the user) to the user of the originating IP phone appliance 10 as determined by the service provider and/or user.

The service provider is able to determine the advertisements, multimedia clips, or other information to target to specific users by correlating the identifying information as received by the data packets with a user database 480. The user database 480 stores information pertaining to various users of phones appliance 10 throughout the system 400. The information stored relates to various characteristics of each user, such as age, buying habits, interests, etc. The information may be acquired by the service provider by periodically transmitting a questionnaire to the users of phones appliance 10 via the system hardware. The questionnaires are provided with routing data packets so that they reach the users of phone appliance 10. The users of phones appliance 10 answer the questionnaires and can transmit the completed questionnaires back to the control center 410. Once each questionnaire is transmitted back to the control center 410, it is provided with data packets, as noted above, for being correctly routed to the control center 410.

The system 400 may provide incentives for the users of IP phones 10 to answer the questionnaires and transmit them back to the control center 410. Such incentives could be, for example, defrayal of long distance charges when making VoIP communication calls, entrance into periodic sweepstakes, free product samples, etc.

The service provider can also acquire the information by noting which advertisements sparked an interest to respective users. The system 400 notes when a user of a phone appliance 10 clicks on or selects an advertisement or information for obtaining additional information about the company, service, product, etc. being advertised or displayed. Accordingly, it is noted that any interaction with the display or portal 16 of the phone appliance 10 by a particular user, may cause a data packet to be transmitted to the control center 410.

The data packet is appended with identifying information for identifying the particular phone appliance 10 which caused the generation and transmission of the data packet. The data packet is also provided with routing information for correctly routing the data packet to the control center 410 or other location. The generation and transmission of data packets with identifying and routing information is performed by data processing and transmission hardware and/or software, as known in the art, provided within the phone appliance 10 and/or computer 21.

It is contemplated that when the user selects an advertisement for obtaining additional information, the control center 410 sends a request to the particular vendor with the user's contact information. It is further contemplated to provide the handset of the phone appliance 10 with a button which a user can press while communicating over the VoIP data network, or other network, for indicating a response to an advertisement or other data displayed by the display screen 16.

The service provider processes the data packets received by the users providing responses to the data displayed on the phone appliance 10. The service provider then appends the user database 480 with any pertinent information related to the particular user which was obtained by processing the data packets. The system 400 is thus a VoIP or data-type communications system configured for obtaining information of interest to advertisers, such as companies, institutions, non-profit organizations, etc., while providing incentives or benefits to users for providing such information.

It is provided that the service provider can sell the information acquired of the various users of the system 400 to the advertisers, vendors, marketing companies, etc. for a fee or an exchange of goods or services. It is further provided that the control center 410 is provided with software modules having programmable instructions for being processed by one or more processors of the system 400 for performing the above-described functions and other functions.

It is provided that the control center 410 further includes a billing station 490 for receiving and processing data packets indicating the initiation and termination of VoIP communications as known in the art. Accordingly, the billing station 490 keeps track of billing information. The billing information is then transmitted to a telecommunications company for billing subscribers of the system 400.

With continued reference to FIGS. 2 and 3, phone appliance 10 also may include a plurality of function keys 24. Function keys 24 can be depressed to perform pre-selected tasks. For example, function keys may be provided to redial the last number dialed, access E-mail from the computer 21, send E-mail, send faxes, call another party, send data to a server, print file, delete a file, retrieve MP-3 files, establishing communication link with a software, etc. The function keys 24 can also be used to respond to advertisements, menus, questions, etc. appearing on the display 16.

For example, the function keys 24, as well as the alpha-numeric keypad 19, can be used to type one's e-mail address within an entry box appearing on the display 16 for transmitting the e-mail address to a vendor or to dial or complete a call to a desired advertiser. It is provided that the responses entered using the function keys 24 and the alpha-numeric keypad 19 are first transmitted to a control center, such as control center 410, operated by the service provider, before being transmitted to the appropriate vendor. The function keys 24 can also be used for transmitting an advertisement displayed to another user or to a certain e-mail address.

In a preferred embodiment, a "record" function key is provided. The record function key may be depressed to record a VoIP conversation. In doing so, the acoustic signals are converted to a corresponding analog signal which in turn is converted to digital data through an analog-to-digital converter. Thereafter, the digital data corresponding to the recorded conversation can be compressed and stored in the computer memory or on disk. Alternately, the service provider may provide a storage warehouse for storing recordings of VoIP conversations, for example, within a memory device located at the control center 410. For a fee, the recorded VoIP conversations can be transmitted to the storage warehouse via the computer 21 or directly for later use.

In another preferred embodiment of phone appliance 10, display screen or portal 16 displays advertisements 26 from local or national service providers or vendors, e.g., local take-out restaurants, etc. By pressing advertisement 26 with pointer 22, a menu or order form will be displayed on screen 16. Thereafter, a send command can be entered to place the order with the local or national service provider or vendor. Software necessary to perform these functions can be dynamically downloaded, via the computer 21, or manually installed by a user via the computer 21, or factory installed into phone 10. Each service provider would be charged a percentage of the sale by a third party vendor for use of the service. Alternately, the third party vendor can be compensated by selling or leasing the software and/or content to the service provider for a fee.

The portal 16 can be further used as an interface with various vendors, such as a brokerage firm, over a VoIP or another data communications network for allowing the user to perform various services, such as directly communicate with the vendors, purchase stocks, etc. It is provided that the communications with the various vendors can be directed through the computer 21 before being transmitted to the various vendors through VoIP or another data communications network or may be directly to VoIP or another data communication network.

It is appreciated that various software modules are provided within the phone appliance 10, the computer 21 or other device for performing the functions described above with respect to the phone appliance 10 and the system 400, such as the phone appliance 10 communicating via the RF connection with the computer 21.

It will be understood that various modifications may be made to the embodiments disclosed herein. For example, a variety of different function keys and touch pad keys may be provided to perform a variety of different tasks not specifically identified here, e.g., grocery shopping. Moreover, phone appliance 10 may include the capability for storing and/or playing music files such as MP3 music files. Therefore, the above description should not be construed as limiting, but merely as exemplification of preferred embodiments. Those skilled in the art will envision other modifications within the scope and spirit of this disclosure.

What is claimed is:

1. A phone appliance configured for making voice communications and for facilitating data communications via at least one data network, the phone appliance comprising:
    a transceiver configured for transmitting or receiving the voice communications or the data communications via the at least one data network, wherein the voice communications are voice-over-data communications, wherein at least one data communication is transmitted or received via at least one data packet, and wherein the at least one data packet is Internet content or information on user interests with the Internet content; and
    a display screen for displaying Internet content relating to an Internet website, wherein the phone appliance is configured for Internet access for interaction with the Internet content to download a software application wirelessly from at least one computer for adding at least one non-phone communication function to the phone appliance,
    wherein the at least one non-phone communication function includes ordering a service or a product online via the at least one data network,
    wherein the phone appliance is configured for obtaining the information on the user interests via the interaction with the Internet content of the website including interaction with the downloaded software application, and wherein the phone appliance is further configured to transmit the information on the user interests via the at least one data packet to the at least one computer for processing,
    wherein the phone appliance is further configured to receive at least another data packet from the at least one computer, and the at least another data packet includes targeted Internet content resulting from the at least one data packet being processed by the at least one computer, and
    wherein the appliance is enabled to download the software application via interaction with the Internet content while a voice communication call is being transmitted.

2. The phone appliance according to claim 1, wherein the phone appliance is a mobile phone.

3. The phone appliance according to claim 1, wherein the phone appliance is configured for cellular capability.

4. The phone appliance according to claim 1, wherein the phone appliance is configured to communicate with a remote computing device or the phone appliance is configured to communicate with a non-remote computing device.

5. The phone appliance according to claim 1, wherein the phone appliance is configured to communicate with a remote server or the phone appliance is configured to communicate with a non-remote server.

6. The phone appliance according to claim 1, wherein the phone appliance is configured to utilize a browser installed on at least one computer.

7. A method for making voice communications and for facilitating data communications via at least one data network, the method comprising:
providing, by at least one computer, the data communications including Internet content or a software application for downloading from an Internet website to a phone appliance enabled for voice communications including voice data communications;
receiving, by the at least one computer, other data communications including information on user interests with the Internet content and the software application downloaded via interaction with the Internet content, wherein the other data communications are received from the phone appliance and correlated with a database; and
transmitting targeted Internet content resulting from correlating the information on the user interests with the database, wherein the targeted Internet content is transmitted to the phone appliance,
wherein the phone appliance is configured for Internet access for the interaction with the Internet content or with the downloaded software application, is configured for downloading the software application wirelessly from the at least one computer via interaction with an Internet website for upgrading the phone appliance, and is configured for downloading the software application wirelessly from the at least one computer via interaction with an Internet website for adding at least one non-phone communication function to the phone appliance,
wherein the downloaded software application adding the at least one non-phone communication function is configured to perform the at least one non-phone communication function including ordering at least one service or product online via the at least one data network, and
wherein the software application for adding the at least one non-phone communication function via interaction with the Internet content is enabled to be downloaded while a voice communication call is being transmitted.

8. The method according to claim 7, wherein the phone appliance is a mobile phone.

9. The method according to claim 7, wherein the phone appliance is configured for cellular capability.

10. The method according to claim 7, wherein the phone appliance is configured to communicate with a remote computing device or the phone appliance is configured to communicate with a non-remote computing device.

11. The method according to claim 7, wherein the phone appliance is configured to communicate with a remote server or the phone appliance is configured to communicate with a non-remote server.

12. A method for facilitating data communications via at least one data network, the method comprising:
providing, by at least one computer, the data communications including a software application for downloading via Internet content, wherein the data communications are provided for transmitting to at least one phone appliance enabled for voice communications including voice-over-data communications;
receiving, by the at least one computer, other data communications including information on user interests via the software application downloaded from the Internet content;
correlating, by the at least one computer, the information on the user interests with a database; and
transmitting, by the at least one computer, targeted Internet content resulting from correlating the information on the user interests with the database,
wherein the software application is configured to be downloaded via the Internet content to the at least one phone appliance, wherein the software application is configured to add at least one additional function to the at least one phone appliance, wherein the downloaded software application adding the at least one additional function is configured to perform the at least one additional function including ordering a service or product online via the at least one data network,
and wherein the at least one computer is enabled to transmit the Internet content during a voice communication call.

13. The method according to claim 12, wherein the step of providing the data communications comprises the step of providing an advertisement, a software application, multimedia, and video.

14. The method according to claim 12, wherein the at least one phone appliance further comprises the step of facilitating recording the voice-over-data communications.

15. The method according to claim 12, further comprising the step of the at least one computer tracking user information, identifying information, or vendor information.

16. The method according to claim 15, wherein the tracked information includes habits, locality, interests, billing, responses of at least one user, or responses of the at least one phone appliance.

17. The method according to claim 12, wherein the at least one phone appliance is a mobile phone appliance.

18. The method according to claim 12, further comprising the step of at least one computer sharing at least one resource of the at least one phone appliance
wherein the at least one resource is selected from the group consisting of computing, processing, and memory.

19. The method according to claim 12, wherein the at least one phone appliance comprises the step of mimicking at least one computer that performs at least one function.

20. The method according to claim 12, wherein the at least one phone appliance includes a display screen, and
wherein the display screen is a touch screen display including an organic light emitting diode display.

21. The method according to claim 12, further comprising the step of the software application facilitating displaying video.

22. The method according to claim 12, further comprising the step of the software application facilitating displaying advertising.

23. The method according to claim 12, wherein the at least one data network further comprises the step of performing at least one gateway function.

24. The method according to claim 12, wherein the at least one phone appliance further comprises the step of facilitating compression of the data communications.

25. The method according to claim 12, wherein the at least one phone appliance further comprises the step of receiving the data communications via a cellular network.

26. The method according to claim 12, wherein the at least one phone appliance further comprises the step of accessing the at least one data network via broadband.

27. The method according to claim 12, wherein the at least one phone appliance is configured for cellular capability.

28. The method according to claim 12, wherein the at least one phone appliance is configured to communicate with a remote computing device or the at least one phone appliance is configured to communicate with a non-remote computing device.

29. The method according to claim 12, wherein the at least one phone appliance is configured to communicate with a remote server or the at least one phone appliance is configured to communicate with a non-remote server.

30. The method according to claim 12, wherein the at least one phone appliance further comprises the step of utilizing a browser installed on at least one computer.

31. The method according to claim 12, wherein the step of downloading from the Internet content comprises the step of downloading from the Internet content of an Internet website.

32. The method according to claim 12, wherein the data communications and the voice-over-data communications are transmitted via an IP-based network.

33. A system for facilitating data communications via at least one data network, the system comprising:
at least one computer configured for transmitting the data communications via the at least one data network, wherein the data communications are transmitted to at least one phone appliance enabled for voice communications including digital voice communications, wherein the data communications include Internet content or a software application for downloading to the at least one phone appliance;
the at least one computer configured to receive information on user interests via interaction with the Internet content;
the at least one computer includes at least one database for maintaining, processing, or analyzing the information on the user interests via the interaction with the Internet content;
the at least one computer configured to transmit targeted Internet content resulting from maintaining, processing, or analyzing the information on the user interests via the interaction with the Internet content, and
wherein the software application is configured to be downloaded via interaction with the Internet content, the software application is configured to be downloaded wirelessly via the at least one data network, the downloaded software application is configured to add at least one additional function to the at least one phone appliance, and the downloaded software application adding the at least one additional function is further configured to order a service or a product online via the at least one data network.

34. The system according to claim 33, wherein the software application facilitates displaying video.

35. The system according to claim 33, wherein the at least one phone appliance facilitates recording the digital voice communications.

36. The system according to claim 33, wherein the at least one phone appliance facilitates tracking of user information, identifying information, or vendor information.

37. The system according to claim 33 wherein the at least one data network performs at least one gateway function.

38. The system according to claim 33, wherein the at least one phone appliance is a mobile phone appliance.

39. The system according to claim 38, wherein the mobile phone appliance shares at least one resource of the at least one computer via Internet access, and wherein the at least one resource is selected from the group consisting of computing, processing, and memory.

40. The system according to claim 33, wherein the at least one phone appliance mimics at least one computer that performs at least one function.

41. The system according to claim 33, wherein the at least one phone appliance includes a display screen, and
wherein the display screen is a touch screen display including at least an organic light emitting diode display.

42. The system according to claim 33, wherein the software application facilitates displaying advertising.

43. The system according to claim 33, wherein the at least one phone appliance facilitates compressing the data communications.

44. The system according to claim 33, wherein the at least one computer is a control center, and
wherein the control center is configured for maintaining at least one database correlating information with at least one user or the at least one phone appliance.

45. The system according to claim 44, wherein the information is selected from the group consisting of habits, locality, billing, interests, responses of the at least one user, and responses of the at least one phone appliance.

46. The system according to claim 33, wherein the at least one phone appliance accesses the at least one data network via broadband.

47. The system according to claim 33, wherein the at least one phone appliance further includes circuitry for receiving the data communications via a cellular network.

48. The system according to claim 33, wherein the at least one phone appliance is configured for cellular capability.

49. The system according to claim 33, wherein the at least one phone appliance is configured to communicate with a remote computing device or the at least one phone appliance is configured to communicate with a non-remote computing device.

50. The system according to claim 33, wherein the at least one phone appliance is configured to communicate with a remote server or the at least one phone appliance is configured to communicate with a non-remote server.

51. The system according to claim 33, wherein the at least one phone appliance is configured to utilize a browser installed on at least one computer.

52. The system according to claim 33, wherein the Internet content is content of an Internet website.

53. The system according to claim 33, wherein the digital voice communications include voice-over-data communications.

54. The system according to claim 33, where the data communications and the digital voice communications are transmitted via an IP-based network.

55. A phone appliance configured for making voice communications and for facilitating data communications via at least one data network, the phone appliance comprising:
a transceiver configured for receiving the voice communications or the data communications via the at least one data network, the voice communications are voice-over-data communications, wherein at least one data communication is received via at least one data packet, wherein the at least one data packet is Internet content; and
a display screen for displaying a website,
wherein the phone appliance is configured for interaction with the Internet content to download at least one software application via the Internet content, the at least one software application is configured for upgrading the phone appliance, wherein the phone appliance is configured for interaction with the Internet content to download at least another software application via the Internet content, the at least another software application adding at least one additional service to the phone appliance including enabling ordering a service or a product online via the at least one data network, wherein the phone appliance is further configured to receive at least another data packet including targeted Internet content resulting from processing user interests via the interaction with the Internet content, and wherein the phone appliance is enabled to interact with the website while at least one voice communication is being transmitted.

56. The phone appliance according to claim 55, wherein the at least another software application facilitates displaying advertising.

57. The phone appliance according to claim 55, wherein the at least another software application facilitates displaying video.

58. The phone appliance according to claim 55, wherein the phone appliance facilitates recording of the voice-over-data communications.

59. The phone appliance according to claim 55, wherein the phone appliance facilitates compressing the at least one data communication.

60. The phone appliance according to claim 55, wherein the phone appliance is a mobile phone appliance.

61. The phone appliance according to claim 60, wherein the mobile phone appliance shares at least one resource of the at least one computer via Internet access, and wherein the at least one resource is selected from the group consisting of computing, processing, and memory.

62. The phone appliance according to claim 55, wherein the at least one data network performs at least one gateway function.

63. The phone appliance according to claim 55, wherein the phone appliance facilitates tracking of user information, identifying information, or vendor information.

64. The phone appliance according to claim 63, wherein the tracked information includes habits, locality, billing, interests, responses of at least one user, or responses of at least one phone appliance.

65. The phone appliance according to claim 55, wherein the display screen is a touch screen display including an organic light emitting diode display.

66. The phone appliance according to claim 55, wherein the phone appliance includes circuitry for receiving the at least one data communication via a cellular network.

67. The phone appliance according to claim 55, wherein the phone appliance accesses the at least one data network via broadband.

68. The phone appliance according to claim 55, wherein the phone appliance is configured for performing or facilitating at least one function selected from the group consisting of placing an order, responding to a query, indicating at least one response to the at least one data communication, playing a music file, playing an MP3 file, responding to vendors, purchasing securities, tracking billing, and shopping.

69. The phone appliance according to claim 55, wherein the phone appliance is configured for cellular capability.

70. The phone appliance according to claim 55, wherein the phone appliance is configured to communicate with a remote computing computer device or the phone appliance is configured to communicate with a non-remote computing computer device.

71. The phone appliance according to claim 55, wherein the phone appliance is configured to communicate with a remote server or the phone appliance is configured to communicate with a non-remote server.

72. The phone appliance according to claim 55, wherein the phone appliance is configured to utilize a browser installed on at least one computer.

73. The phone appliance according to claim 55, where the at least one data communication and the voice-over-data communications are transmitted via an IP-based network.

74. A method for making voice communications and for facilitating data communications via at least one data network, the method comprising:

providing, by at least one computer, the data communications including a software application for downloading via Internet content, wherein the data communications are provided for downloading to at least one phone appliance enabled for voice communications including voice-over-data communications;

receiving, by the at least one computer, other data communications including information on user interests with the software application downloaded, wherein the other data communications are received from the at least one phone appliance and correlated with a database; and transmitting targeted Internet content resulting from correlating the information on the user interests with the database, wherein the targeted Internet content is transmitted to the at least one phone appliance, wherein the downloaded software application is configured for interaction with the Internet content, is configured for downloading from the at least one computer at least one additional service to the at least one phone appliance, wherein the downloaded software application is configured to perform the at least one additional service including ordering a service or a product online via the at least one data network, and wherein the at least one computer is enabled to transmit the Internet content during a voice communication call.

75. The method according to claim 74, further comprising the step of the software application facilitating displaying advertising.

76. The method according to claim 74, further comprising the step of the software application facilitating displaying video.

77. The method according to claim 74, wherein the at least one phone appliance further comprises the step of, recording the voice-over-data communications.

78. The method according to claim 74, wherein the at least one phone appliance further comprises the step of facilitating compressing the data communications.

79. The method according to claim 74, wherein the at least one phone appliance is a mobile phone appliance.

80. The method according to claim 74, further comprising the step of the at least one computer sharing at least one resource of the at least one phone appliance, the at least one resource being selected from the group consisting of computing, processing, and memory.

81. The method according to claim 74, wherein the at least one appliance further comprises the step of facilitating tracking of user information, identifying information, or vendor information.

82. The method according to claim 81, wherein the tracked information includes habits, locality, billing, interests, responses of at least one user, or responses of the at least one phone appliance.

83. The method according to claim 74, further comprising displaying at least one data communication received via the at least one data network on a display screen of the at least one phone appliance,
wherein the display screen includes a touch screen display including an organic light emitting diode display.

84. The method according to claim 83, wherein the at least one phone appliance further comprises the step of receiving the data communications via a cellular network.

85. The method according to claim 74, wherein the at least one phone appliance further comprises the step of accessing the at least one data network via broadband.

86. The method according to claim 74, wherein the at least one phone appliance further comprises the step of performing at least one function selected from the group consisting of placing an order, responding to a query, indicating a response to a displayed at least one data communication, playing a music file, playing an MP3 file, responding to vendors, purchasing securities, tracking billing, and shopping.

87. The method according to claim 74, wherein the at least one phone appliance is configured for cellular capability.

88. The method according to claim 74, wherein the at least one phone appliance is configured to communicate with a remote computing device or the at least one phone appliance is configured to communicate with a non-remote computing device.

89. The method according to claim 74, wherein the at least one phone appliance is configured to communicate with a remote server or the at least one phone appliance is configured to communicate with a non-remote server.

90. The method according to claim 74, wherein the at least one phone appliance further comprises the step of utilizing a browser installed on at least one computer.

91. The method according to claim 74, further comprising the step of transmitting via an IP-based network, the data communications and the voice-over-data communications.

92. A system for making voice communications and for facilitating data communications via at least one data network, the system comprising:
at least one phone appliance including a transceiver configured for receiving the data communications for display or the voice communications via the at least one data network, the voice communications include digital voice communications;
a display screen for displaying the data communications received via the at least one data network;
at least one data communication is received via at least one data packet, wherein the at least one data packet includes Internet content, and wherein the at least one data communication further includes targeted Internet content resulting from processing user interests via interaction with software downloaded from a portal displayed on the display screen; and
a computer in operative communication with the at least one data network, the computer configured for processing the data communications for display and to transmit the data communications via the at least one data network,
wherein the at least one phone appliance is configured for Internet access for the interaction with the Internet content, is configured for interaction with the the portal to download at least one software application for upgrading the at least one phone appliance, and is further configured for interaction with the portal to download at least another software application for adding at least one additional function to the at least one phone appliance,
and wherein the downloaded at least another software application for adding the at least one additional function to the at least one phone appliance is configured to enable ordering a service or product online via the at least one data network.

93. The system according to claim 92, wherein the at least one phone appliance facilitates recording of the digital voice communications.

94. The system according to claim 92, wherein the at least one phone appliance facilitates compressing the data communications.

95. The system according to claim 92, wherein the at least one phone appliance is a mobile phone appliance.

96. The system according to claim 95, wherein the mobile phone appliance shares at least one resource of the computer via Internet access, and
wherein the at least one resource is selected from the group consisting of computing, processing, and memory.

97. The system according to claim 92, wherein the at least one data network performs at least one gateway function.

98. The system according to claim 92, wherein the at least one phone appliance facilitates tracking of user information, identifying information, or vendor information.

99. The system according to claim 98, wherein the tracked information includes habits, locality, billing, interests, at least one response of at least one user, or at least one response of the at least one phone appliance.

100. The system according to claim 92, wherein the display screen is a touch screen display including an organic light emitting diode display.

101. The system according to claim 92, wherein the at least one phone appliance receives the data communications via a cellular network.

102. The system according to claim 92, wherein the at least one phone appliance accesses the at least one data network via broadband.

103. The system according to claim 92, wherein the at least one phone appliance is configured for performing at least one function selected from the group consisting of redialing, completing a call, recording data, placing an order, accessing e-mail, accessing information, transmitting an e-mail, transmitting a facsimile, calling another party, transmitting data, storing a file, storing data, enabling a speaker function, responding to a query, indicating at least one response to the displayed data, printing a file, playing a music file, playing an MP3 file, deleting a file, retrieving a file, establishing a communications link, responding to vendors, typing an e-mail address, purchasing securities, tracking billing, and shopping.

104. The system according to claim 92, wherein the at least another software application facilitates displaying advertising.

105. The system according to claim 92, wherein the at least another software application facilitates displaying video.

106. The system according to claim 92, wherein the at least one phone appliance is configured for cellular capability.

107. The system according to claim 92, wherein the at least one phone appliance is configured to communicate with a remote computing device or the at least one phone appliance is configured to communicate with a non-remote computing device.

108. The system according to claim 92, wherein the at least one phone appliance is configured to communicate with a remote server or the at least one phone appliance is configured to communicate with a non-remote server.

109. The system according to claim 92, wherein the at least one phone appliance utilizes a browser installed on the computer.

110. The system according to claim 92, wherein the digital voice communications include voice-over-data communications.

111. The system according to claim 92, wherein the data communications for display and the digital voice communications are transmitted via an IP-based network.

112. A system for facilitating data communications via at least one data network, the system comprising:
- at least one computer configured for transmitting the data communications via the at least one data network, wherein the data communications are transmitted to at least one phone appliance enabled for voice communications including voice-over-data communications, wherein the data communications include a software application;
- the at least one computer is configured to receive information on user interests in response to at least one communication via the software application;
- the at least one computer includes at least one database for maintaining, processing, or analyzing the information on the user interests in response to the at least one communication via the software application; and
- wherein the at least one computer is configured to transmit targeted Internet content resulting from maintaining, processing, or analyzing the information on the user interests in response to the at least one communication via the software application,
- wherein the software application is configured to be downloaded via interaction with Internet content, the software application is enabled to be downloaded wirelessly via the at least one data network, the downloaded software application is configured to add at least one additional function to the at least one phone appliance, and the downloaded software application adding the at least one additional function is further configured to order at least one service or product online via the software application, and
- wherein the at least one computer is enabled to transmit the Internet content during a voice communication call.

113. The system according to claim 112, wherein the at least one phone appliance further includes circuitry for communicating with a cellular network.

114. The system according to claim 112, wherein the at least one phone appliance includes a display screen, and
- wherein the display screen is a touch screen display including an organic light emitting diode display.

115. The system according to claim 112, wherein the at least one phone appliance is configured for cellular capability.

116. The system according to claim 112, wherein the at least one phone appliance is configured to communicate with a remote computing device or the at least one phone appliance is configured to communicate with a non-remote computing device.

117. The system according to claim 112, wherein the at least one phone appliance is configured to communicate with a remote server or the at least one phone appliance is configured to communicate with a non-remote server.

118. The system according to claim 112, wherein the at least one phone appliance is configured to utilize a browser installed on at least one computer.

119. The system according to claim 112, wherein the data communications and the voice-over-data communications are transmitted via an IP-based network.

\* \* \* \* \*